Oct. 20, 1936.  E. WHITMORE  2,057,807
MAGNIFYING DEVICE
Filed Aug. 20, 1935
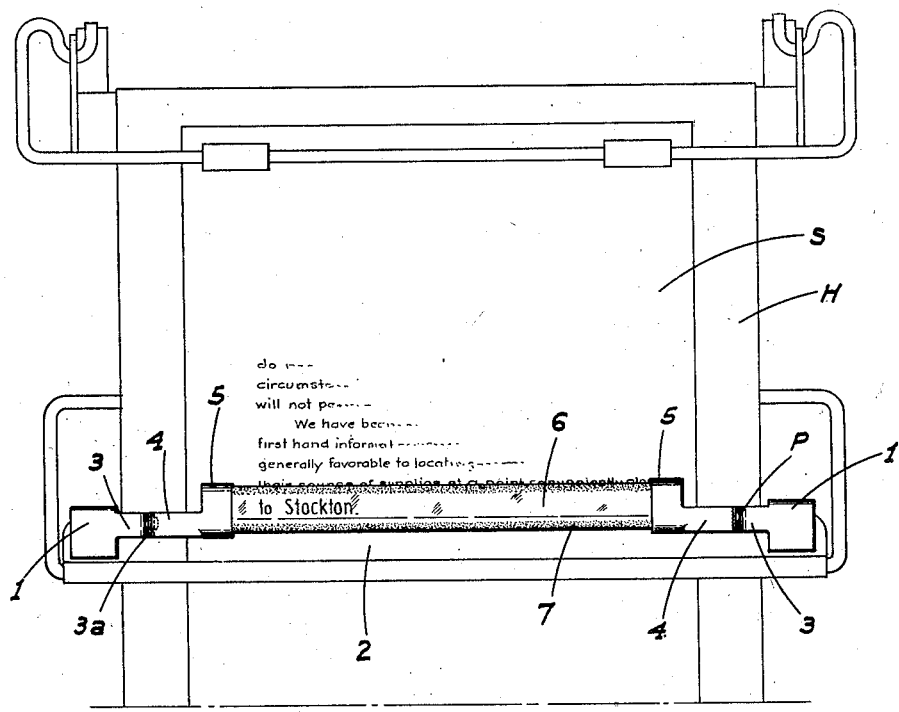
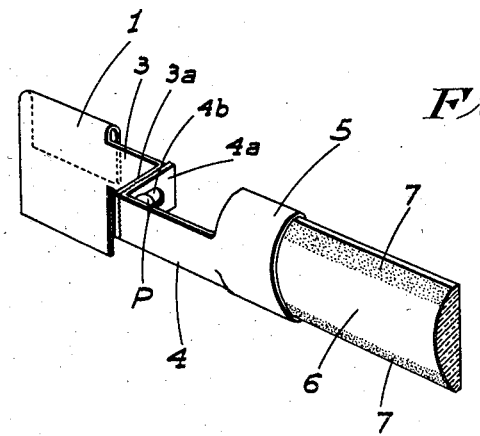
INVENTOR
*Ed Whitmore*
BY
ATTORNEY Patented Oct. 20, 1936

2,057,807

UNITED STATES PATENT OFFICE 2,057,807

MAGNIFYING DEVICE

Ed Whitmore, Modesto, Calif.

Application August 20, 1935, Serial No. 37,034

1 Claim. (Cl. 88—39)

This invention relates generally to a magnifying device and is directed in particular to a magnifying device for use in connection with transcribing and other copying work, such as in recorders' offices and the like.

The principal object of my invention is to provide a magnifying device for attachment to the horizontal line gauge devices such as of that type sold under the trade name of "Line-a-time". It is my purpose to provide such a magnifying device which will magnify one or more lines of writing immediately above the horizontal line gauge as commonly employed. My device is constructed for use on any horizontal line gauge which is moved a line at a time relative to the sheet upon which the written matter appears. It is not requisite of course that the line gauge move. The relative movement may also be accomplished by moving the sheet upon which the written matter appears.

A further object of my invention is to provide a magnifying device for attachment to a horizontal line gauge which device may be adjusted for proper magnification to the eye of the person making the transcription.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1 is a front elevation of my device as attached to a "Line-a-time" machine.

Figure 2 is a fragmentary perspective with the magnifying lens in section at one end.

Referring now more particularly to the characters of reference on the drawing, the attachment comprises plate like clips 1 for frictional engagement with the upper edges of a horizontal line gauge 2 adjacent its ends, said gauge being as usual in the form of a strip resting against the sheet S mounted on the holder H of which the gauge forms a part. Projecting inwardly from the clip are fingers 3 bent forward at right angles at their outer ends, as at 3a.

Engaging and pivotally connected to such outturned ends of fingers 3a through the medium of a pin P are inturned ends 4a of other fingers 4, said fingers 4 having lens supporting bands 5 formed on adjacent ends. The pivotal connections between the bent ends 3a and 4a are relatively tight, frictional elements being secured if desired between the said ends. Slots 4b are provided in the ends 4a so that the lens may be moved to or from the surface of the paper.

The supporting bands 5 are fixedly secured to the ends of a relatively long narrow strip-like magnifying lens 6 which is preferably flat on its back surface and convex on its face although it may be convex on both surfaces if found desirable. This magnifying lens is etched or frosted adjacent its edges for the full length thereof as at 7.

In use the device is attached to a horizontal line gauge as heretofore described and the lens adjusted by turning the same on its pin connections P and moving the same in or out through the medium of the slots 4b until a line or lines of writing on the sheet S immediately above the line gauge are visible through the lens, the image of said line or lines of course being greatly magnified, thus facilitating reading of the same for the purposes of transcription.

The frosted portion of the lens along the edges prevents undue glare and also prevents annoyance from the spherical aberration or distortion which would otherwise appear along the edges of the lens.

While different colors of glass may be used, it will be usually found that amber will be the kindest to the eyes.

For very fine writing it may be found desirable to use two glasses.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A line magnifying attachment for a line gauge device, such device including a sheet holder and a gauge strip extending across and close to the holder to terminations beyond the same on both sides thereof; said attachment comprising strips for straddling engagement with the gauge strip beyond the holder, flat elements projecting outwardly relative to the strip formed on the adjacent ends of the clips, a strip-like lens disposed between the elements, holders engaging the ends of the lens, and flat elements formed with the holders beyond the ends of the lens and projecting toward the gauge strip from a plane adjacent the front of the lens and extending across the adjacent faces of the clip elements, and means adjustably connecting said elements together.

ED WHITMORE.